(12) United States Patent
Pezeshki et al.

(10) Patent No.: US 11,212,691 B2
(45) Date of Patent: Dec. 28, 2021

(54) INDICATING A SUBBAND INTERFERENCE LEVEL USING SOUNDING REFERENCE SIGNAL

(71) Applicant: QUALCOMM Incorporated, San Diego, CA (US)

(72) Inventors: Hamed Pezeshki, San Diego, CA (US); Tao Luo, San Diego, CA (US); Yan Zhou, San Diego, CA (US); Xiaoxia Zhang, San Diego, CA (US); Arumugam Chendamarai Kannan, San Diego, CA (US); Jing Sun, San Diego, CA (US); Konstantinos Dimou, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/703,624

(22) Filed: Dec. 4, 2019

(65) Prior Publication Data

US 2021/0176654 A1 Jun. 10, 2021

(51) Int. Cl.
*H04W 24/08* (2009.01)
*H04W 24/10* (2009.01)
(Continued)

(52) U.S. Cl.
CPC .......... *H04W 24/10* (2013.01); *H04B 17/336* (2015.01); *H04L 5/0051* (2013.01);
(Continued)

(58) Field of Classification Search
CPC ..... H04W 72/1226; H04W 24/10; H04B 1/10
See application file for complete search history.

(56) References Cited

U.S. PATENT DOCUMENTS

2012/0213261 A1* 8/2012 Sayana ................ H04L 5/0094
375/224
2013/0196675 A1* 8/2013 Xiao .................... H04L 5/0094
455/452.1
(Continued)

FOREIGN PATENT DOCUMENTS

EP 1804409 A1 7/2007
EP 3379747 A1 9/2018

OTHER PUBLICATIONS

International Search Report and Written Opinion—PCT/US2020/063168—ISA/EPO—dated Feb. 18, 2021.

*Primary Examiner* — Zhiren Qin
(74) *Attorney, Agent, or Firm* — Qualcomm Incorporated

(57) ABSTRACT

Various aspects of the present disclosure generally relate to wireless communication. In some aspects, a user equipment (UE) may perform a first interference measurement on a first subband of a plurality of subbands configured for the UE and a second interference measurement on a second subband of the plurality of subbands. The UE may identify a first interference level based at least in part on the first interference measurement and a second interference level based at least in part on the second interference measurement. The UE may transmit, to a base station, a first sounding reference signal (SRS) on the first subband and a second SRS on the second subband, wherein an SRS sequence of the first SRS indicates the first interference level, and wherein an SRS sequence of the second SRS indicates the second interference level. Numerous other aspects are provided.

30 Claims, 12 Drawing Sheets

(51) Int. Cl.
*H04B 17/336* (2015.01)
*H04L 5/00* (2006.01)
*H04L 25/02* (2006.01)
*H04W 72/04* (2009.01)
*H04W 72/12* (2009.01)

(52) U.S. Cl.
CPC ........ *H04L 5/0055* (2013.01); *H04L 25/0226* (2013.01); *H04W 72/0453* (2013.01); *H04W 72/1257* (2013.01)

(56) References Cited

U.S. PATENT DOCUMENTS

2014/0126402 A1* 5/2014 Nam .................... H04B 7/0632
    370/252
2016/0262156 A1* 9/2016 Yilmaz ............... H04W 72/082
2018/0041318 A1* 2/2018 Sudo .................... H04L 27/2613
2018/0049222 A1   2/2018 Manolakos et al.
2018/0191483 A1   7/2018 Yamazaki et al.
2018/0343588 A1 11/2018 Sadek et al.

* cited by examiner

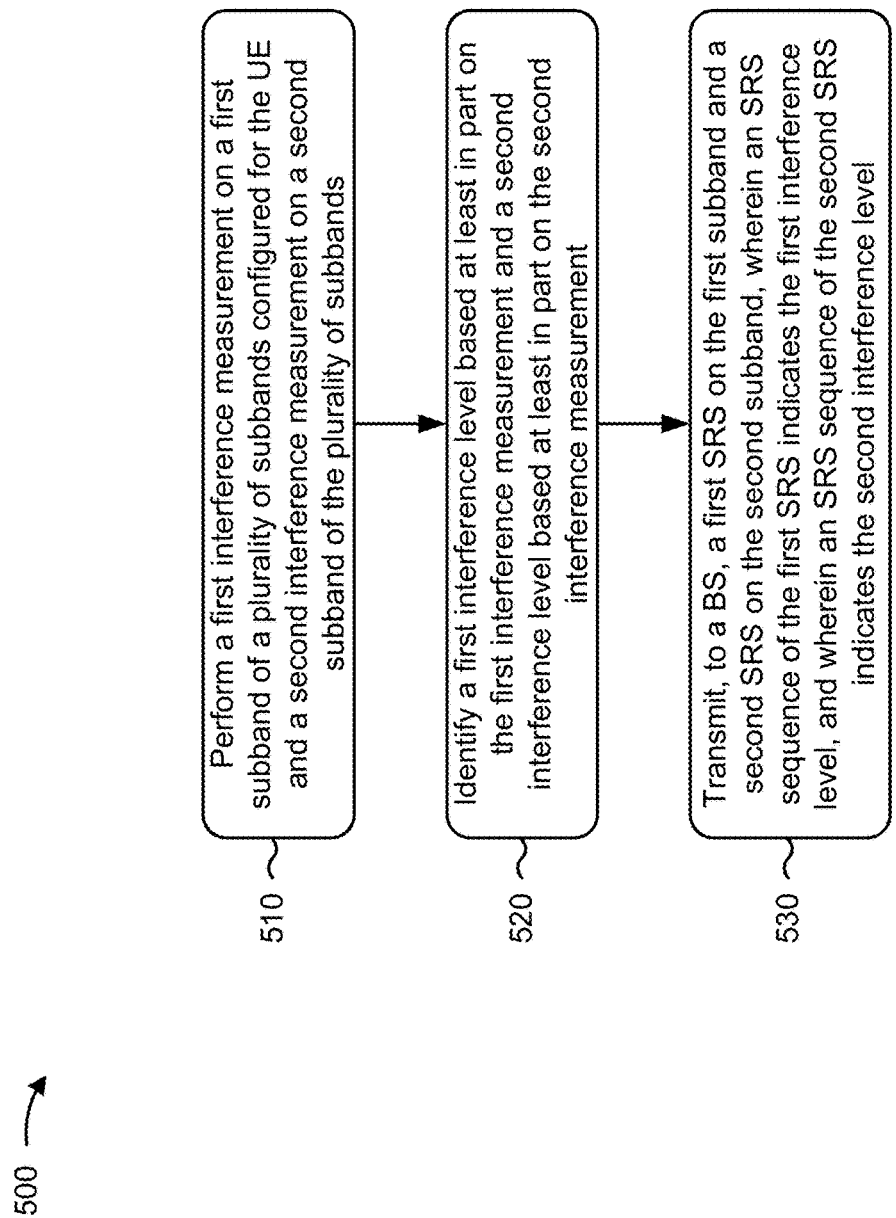

INDICATING A SUBBAND INTERFERENCE LEVEL USING SOUNDING REFERENCE SIGNAL

FIELD OF THE DISCLOSURE

Aspects of the present disclosure generally relate to wireless communication and to techniques and apparatuses for indicating a subband interference level using sounding reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include performing a first interference measurement on a first subband of a plurality of subbands configured for the UE and a second interference measurement on a second subband of the plurality of subbands; identifying a first interference level based at least in part on the first interference measurement and a second interference level based at least in part on the second interference measurement; and transmitting, to a base station (BS), a first sounding reference signal (SRS) on the first subband and a second SRS on the second subband, wherein an SRS sequence of the first SRS indicates the first interference level, and wherein an SRS sequence of the second SRS indicates the second interference level.

In some aspects, a method of wireless communication, performed by a BS, may include receiving, from a UE, a first SRS on a first subband of a plurality of subbands configured for the UE and a second SRS on a second subband of the plurality of subbands; identifying a first interference level of the first subband based at least in part on an SRS sequence of the first SRS; identifying a second interference level of the second subband based at least in part on an SRS sequence of the second SRS; and transmitting, to the UE and based at least in part on the first interference level and the second interference level, a physical downlink control channel (PDCCH) communication that reconfigures one or more semi-persistent scheduling (SPS) occasions for physical downlink shared channel (PDSCH) communication reception from the first subband to the second subband.

In some aspects, a UE for wireless communication may include memory and one or more processors operatively coupled to the memory. The memory and the one or more processors may be configured to perform a first interference measurement on a first subband of a plurality of subbands configured for the UE and a second interference measurement on a second subband of the plurality of subbands; identify a first interference level based at least in part on the first interference measurement and a second interference level based at least in part on the second interference measurement; and transmit, to a BS, a first SRS on the first subband and a second SRS on the second subband, wherein an SRS sequence of the first SRS indicates the first interference level, and wherein an SRS sequence of the second SRS indicates the second interference level.

In some aspects, a BS for wireless communication may include memory and one or more processors operatively coupled to the memory. The memory and the one or more processors may be configured to receive, from a UE, a first SRS on a first subband of a plurality of subbands configured for the UE and a second SRS on a second subband of the plurality of subbands; identify a first interference level of the first subband based at least in part on an SRS sequence of the first SRS; identify a second interference level of the second subband based at least in part on an SRS sequence of the second SRS; and transmit, to the UE and based at least in part on the first interference level and the second interference level, a PDCCH communication that reconfigures one or more SPS occasions for PDSCH communication reception from the first subband to the second subband.

In some aspects, a non-transitory computer-readable medium may store one or more instructions for wireless communication. The one or more instructions, when executed by one or more processors of a UE, may cause the one or more processors to perform a first interference measurement on a first subband of a plurality of subbands configured for the UE and a second interference measurement on a second subband of the plurality of subbands; identify a first interference level based at least in part on the first interference measurement and a second interference level based at least in part on the second interference measurement; and transmit, to a BS, a first SRS on the first subband and a second SRS on the second subband, wherein an SRS sequence of the first SRS indicates the first interference level, and wherein an SRS sequence of the second SRS indicates the second interference level.

In some aspects, a non-transitory computer-readable medium may store one or more instructions for wireless communication. The one or more instructions, when executed by one or more processors of a BS, may cause the one or more processors to receive, from a UE, a first SRS on a first subband of a plurality of subbands configured for the UE and a second SRS on a second subband of the plurality of subbands; identify a first interference level of the first subband based at least in part on an SRS sequence of the first SRS; identify a second interference level of the second subband based at least in part on an SRS sequence of the second SRS; and transmit, to the UE and based at least in part on the first interference level and the second interference level, a PDCCH communication that reconfigures one or more SPS occasions for PDSCH communication reception from the first subband to the second subband.

In some aspects, an apparatus for wireless communication may include means for performing a first interference measurement on a first subband of a plurality of subbands configured for the apparatus and a second interference measurement on a second subband of the plurality of subbands; means for identifying a first interference level based at least in part on the first interference measurement and a second interference level based at least in part on the second interference measurement; and means for transmitting, to a BS, a first SRS on the first subband and a second SRS on the second subband, wherein an SRS sequence of the first SRS indicates the first interference level, and wherein an SRS sequence of the second SRS indicates the second interference level.

In some aspects, an apparatus for wireless communication may include means for receiving, from a UE, a first SRS on a first subband of a plurality of subbands configured for the UE and a second SRS on a second subband of the plurality of subbands; means for identifying a first interference level of the first subband based at least in part on an SRS sequence of the first SRS; means for identifying a second interference level of the second subband based at least in part on an SRS sequence of the second SRS; and means for transmitting, to the UE and based at least in part on the first interference level and the second interference level, a PDCCH communication that reconfigures one or more SPS occasions for PDSCH communication reception from the first subband to the second subband.

Aspects generally include a method, apparatus, system, computer program product, non-transitory computer-readable medium, user equipment, base station, wireless communication device, and/or processing system as substantially described with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a UE, in accordance with various aspects of the present disclosure.

DETAILED DESCRIPTION

Figure 1:
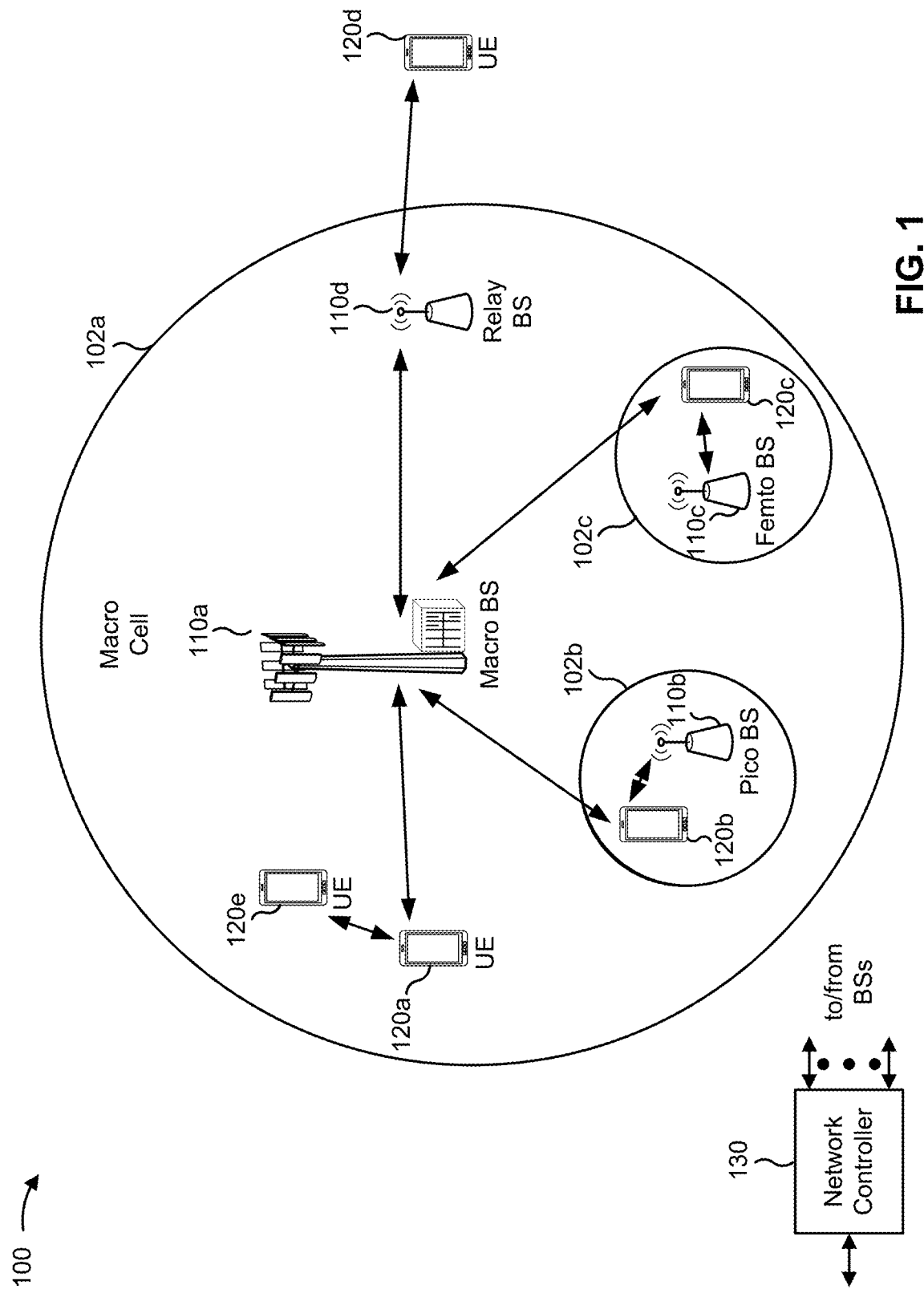
FIG. 1 is a block diagram conceptually illustrating an example of a wireless communication network, in accordance with various aspects of the present disclosure.

In a wireless network, a base station (BS) and a user equipment (UE) may communicate via an access link, which may include an uplink and a downlink. In some cases, the bandwidth of the uplink and/or the downlink may span across a plurality of subbands, such as where multi-panel frequency division multiplexing (FDM) and analog beamforming-based multi-user multiple input multiple output (MU-MIMO) are deployed. Given the complexity of such deployments in an industrial Internet of things (IoT) setting and/or other settings having tight latency requirements, it may be difficult for the UE to report interference in the plurality of subbands. For example, the BS may dynamically and explicitly instruct the UE via downlink control information (DCI) to enable beam sweeping in the plurality of subbands for purposes of interference measurement. However the latency of the interference measurements may increase to a level that does not meet the latency requirements of industrial IoT and/or other settings having tight latency requirements.

Some aspects described herein provide techniques and apparatuses for indicating a subband interference level using sounding reference signal (SRS). In some aspects, a UE may be capable of autonomously determining whether to perform interference measurements across a plurality of subbands, which decreases latency in performing interference measurements and reporting interference in the plurality of subbands. For example, the UE may determine to perform interference measurements across a plurality of subbands based at least in part on determining to transmit a negative acknowledgement (NACK) for a physical downlink shared channel (PDSCH) communication transmitted from the BS.

The UE may perform the interference measurements based at least in part on a measurement resource in each of the plurality of subbands. The patterns and/or resources of the measurement resources may be determined/configured by the BS and/or another entity. The UE may convert the interference measurements to quantized interference levels (e.g., low, medium, and high, or another quantized scheme).

In some aspects, the UE may be capable of indicating interference levels to the BS using SRSs. In this case, the UE may transmit SRSs in each of the plurality of subbands. The UE may generate an SRS sequence for each SRS such that the SRS sequence for a particular SRS indicates the quantized interference level in the subband associated with the SRS.

In this way, the BS may receive the SRSs in each of the plurality of subbands, may identify the interference level in each of the plurality of subbands based at least in part on the SRS sequences of the SRSs, and may perform one or more actions based at least in part on the interference levels in each of the plurality of subbands. For example, the BS may schedule a retransmission of a PDSCH communication from a subband having a high interference level to another subband having a low interference level. As another example, the BS may reconfigure one or more semi-persistent scheduling (SPS) occasions for PDSCH communication reception from a subband having a high interference level to another subband having a low interference level.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered IoT devices, and/or may be implemented as may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
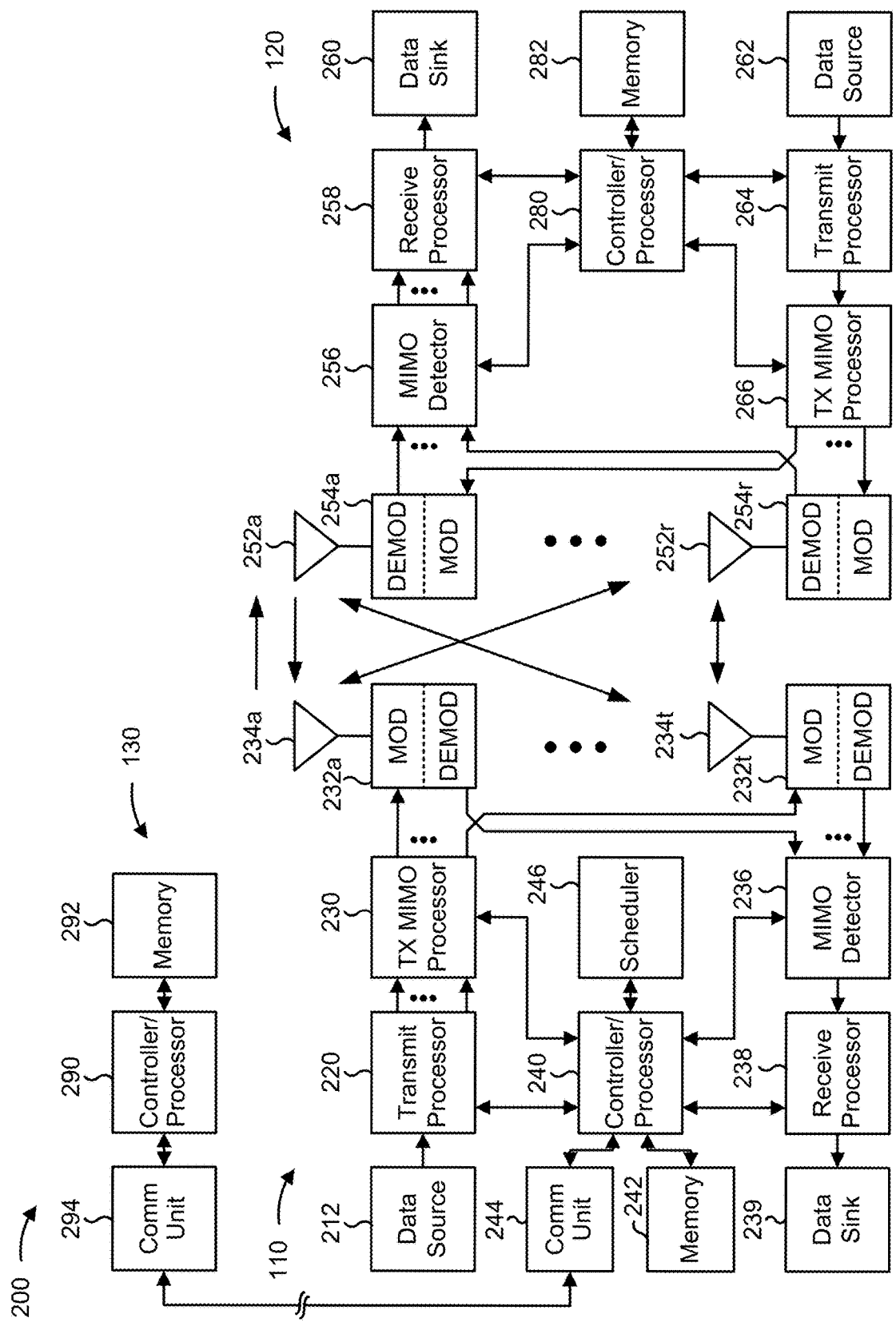
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating a subband interference level using sounding reference signal (SRS), as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

The stored program codes, when executed by processor 280 and/or other processors and modules at UE 120, may cause the UE 120 to perform operations described with respect to process 500 of FIG. 5 and/or other processes as described herein. The stored program codes, when executed by processor 240 and/or other processors and modules at base station 110, may cause the base station 110 to perform operations described with respect to process 600 of FIG. 6 and/or other processes as described herein. A scheduler 246 may schedule UEs for data transmission on the downlink and/or uplink.

In some aspects, UE 120 may include means for performing a first interference measurement on a first subband of a plurality of subbands configured for the UE and a second interference measurement on a second subband of the plurality of subbands, means for identifying a first interference level based at least in part on the first interference measurement and a second interference level based at least in part on the second interference measurement, means for transmitting, to a BS 110, a first SRS on the first subband and a second SRS on the second subband, wherein an SRS sequence of the first SRS indicates the first interference level and wherein an SRS sequence of the second SRS indicates the second interference level, and/or the like. In some aspects, such means may include one or more components of UE 120 described in connection with FIG. 2.

In some aspects, base station 110 may include means for receiving, from a UE 120, a first SRS on a first subband of a plurality of subbands configured for the UE 120 and a second SRS on a second subband of the plurality of subbands, means for identifying a first interference level of the first subband based at least in part on an SRS sequence of the first SRS, means for identifying a second interference level of the second subband based at least in part on an SRS sequence of the second SRS, means for transmitting, to the UE and based at least in part on the first interference level and the second interference level, a PDCCH communication that reconfigures one or more SPS occasions for PDSCH communication reception from the first subband to the second subband, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
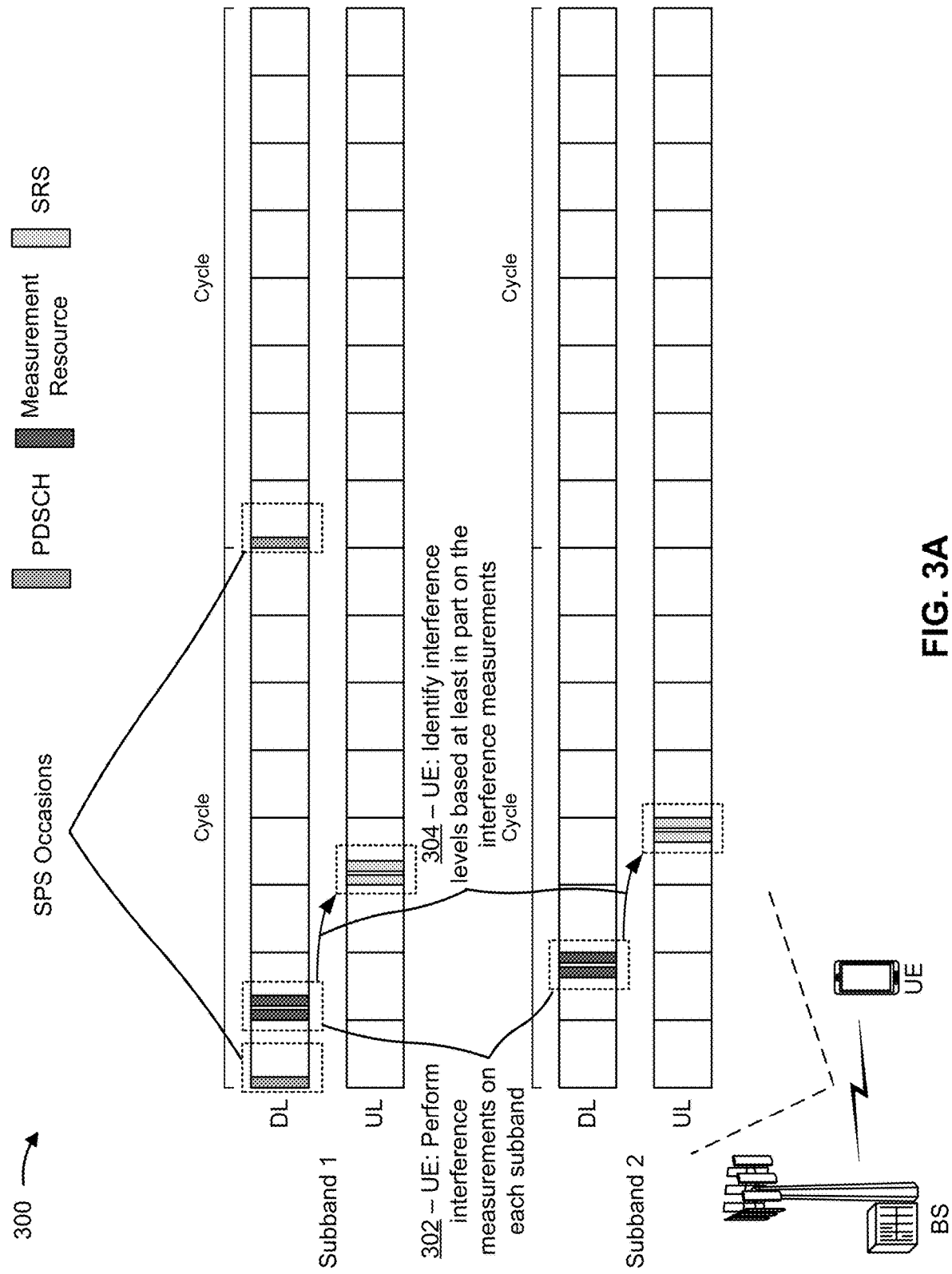
FIGS. 3A-3C and 4A-4E are diagrams illustrating examples of indicating a subband interference level using sounding reference signal, in accordance with various aspects of the present disclosure.
Figure 3B:
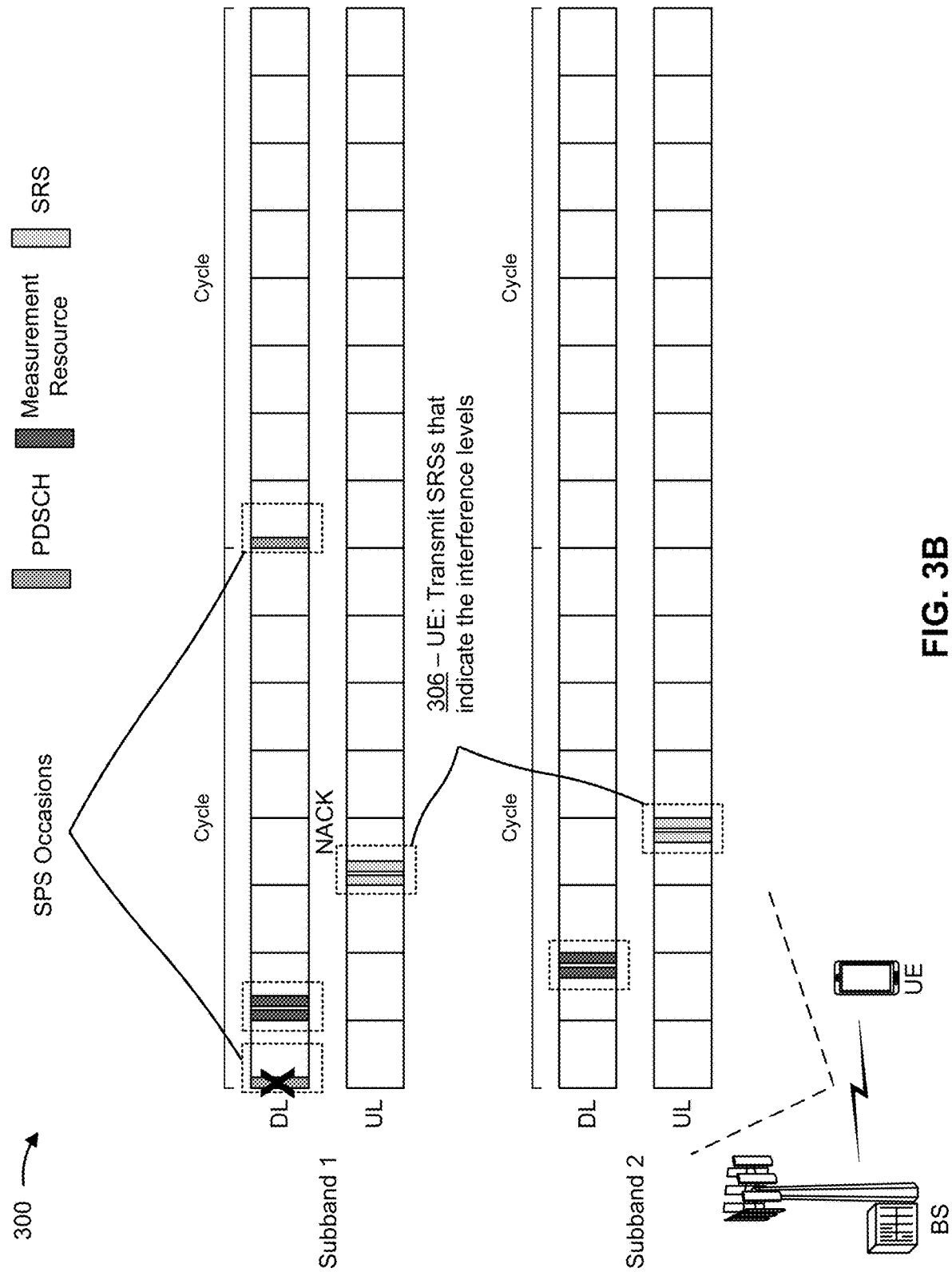
Figure 3C:
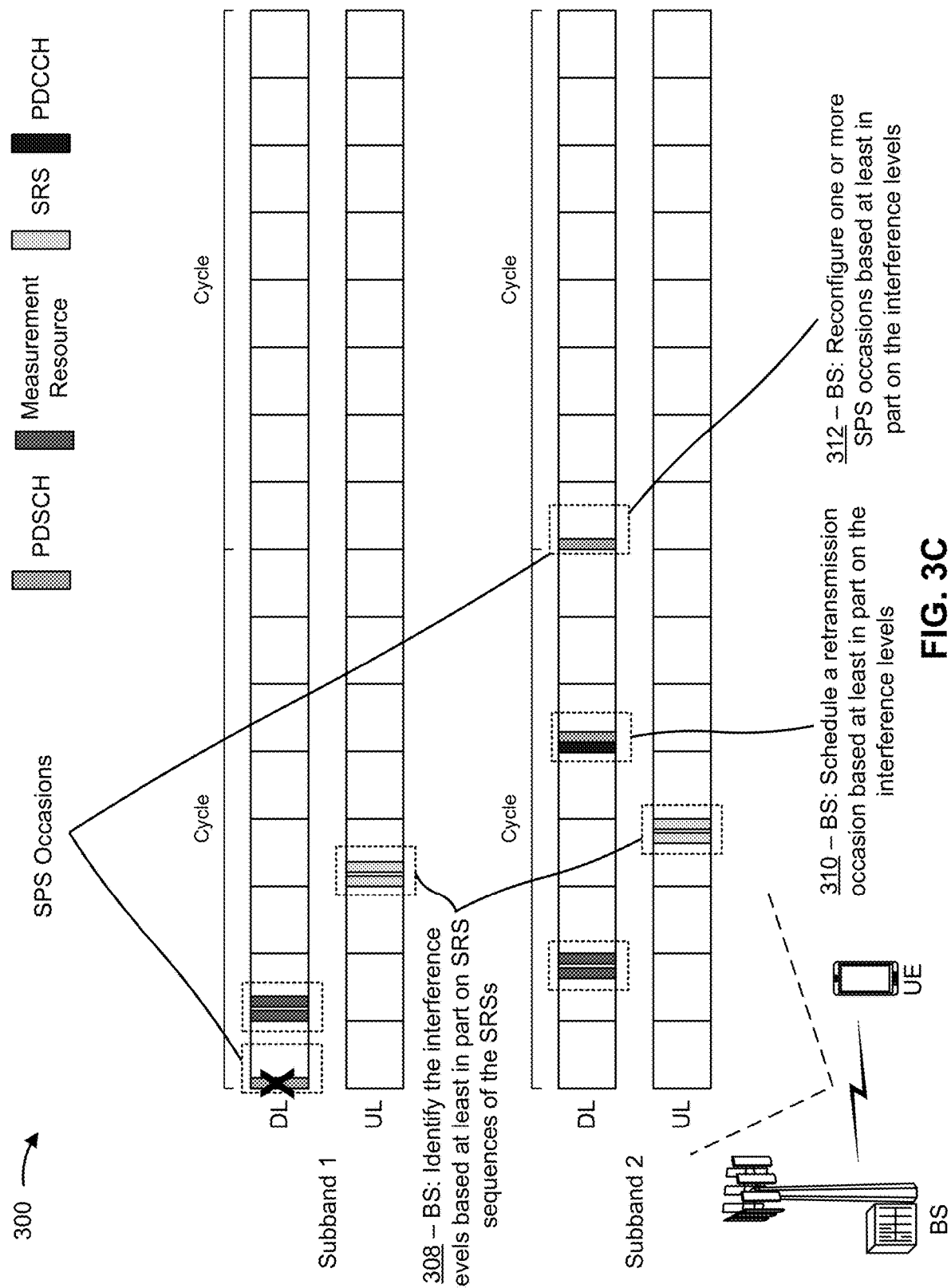

FIGS. 3A-3C are diagrams illustrating one or more examples 300 of indicating a subband interference level using SRS, in accordance with various aspects of the present disclosure. As shown in FIGS. 3A-3C, example(s) 300 may include communication between a BS (e.g., BS 110) and a UE (e.g., UE 120). In some aspects, The BS and the UE may be included in a wireless network (e.g., wireless network 100) and may communicate via an access link that includes an uplink and a downlink. In some aspects, the BS and the UE may be included in an industrial IoT deployment and/or another type of deployment (e.g., an ultra reliable low latency communication (URLLC) deployment, an enhanced mobile broadband (eMBB) deployment, and/or the like) in the wireless network.

As shown in FIG. 3A, in some aspects, the bandwidth of the uplink (UL) and the downlink (DL) may each span across a plurality of subbands. In this case, a first portion of the bandwidth of the uplink and the downlink may be included in a first subband (e.g., subband 1), a second portion of the bandwidth of the uplink and the downlink may be included in a second subband (e.g., subband 2), and so on.

As further shown in FIG. 3A, the BS may schedule the transmission of PDSCH communications to the UE on the downlink via SPS scheduling. For example, the BS may transmit, to the UE, one or more radio resource control (RRC) communications, one or more medium access control control element (MAC-CE) communications, and/or the like, which may configure periodic and/or aperiodic SPS occasions on the downlink. The SPS occasions may be time-frequency domain resources (e.g., symbols, slots, resource elements, resource blocks, subcarriers, and/or the like) scheduled on a particular subband. In the example illustrated in FIG. 3A, the SPS occasions configured for the UE are scheduled on subband 1.

In some aspects, the BS may be capable of reconfiguring SPS occasions configured for the UE and/or may be capable of scheduling retransmission occasions for retransmission of PDSCH communications to the UE. The BS may reconfigure SPS occasions and/or may schedule retransmission occasions based at least in part on interference on the plurality of subbands, among other factors and/or examples.

As further shown in FIG. 3A, and by reference number 302, the UE may perform interference measurements on each subband to support the BS in reconfiguring SPS occasions and/or scheduling retransmission occasions. For example, the UE may perform one or more interference measurements in subband 1, one or more interference measurements in subband 2, and so on. In some aspects, the UE may perform the interference measurements based at least in part on receiving a PDSCH communication in an SPS occasion, based at least in part on determining that a received PDSCH communication is not decodable, based at least in part on the BS configuring periodic measurement resources, and/or the like.

The UE may measure one or more measurement resources in each of the plurality of subbands to determine one or more interference measurements for each of the plurality of subbands. In some aspects, the BS may transmit a measurement resource in each of the plurality of subbands. In some aspects, the BS may transmit a plurality of measurement resources in each of the plurality of subbands, where each measurement resource in a particular subband is transmitted on a different beam in the subband. A measurement resource may include a channel state information reference signal (CSI-RS), a demodulation reference signal (DMRS), another type of reference signal, an interference measurement resource (IMR) that occurs at a particular time-frequency resource, and/or the like. An interference measurement may include an RSRP measurement, an RSSI measurement, an RSRQ measurement, a CQI measurement, a signal to noise ratio (SNR) measurement, a signal to interference plus noise ratio (SINR) measurement, a log likelihood ratio (LLR) value, and/or the like.

As further shown in FIG. 3A, and by reference number 304, the UE may identify interference levels based at least in part on the interference measurements for each of the plurality of subbands. For example, the UE may identify one or more interference levels for subband 1 based at least in part on the one or more interference measurements in subband 1, may identify one or more interference levels for subband 2 based at least in part on the one or more interference measurements in subband 2, and so on.

In this case, the UE may quantize each of the interference measurements to a corresponding quantized interference level. As an example, the possible interference levels may be divided into three or more non-overlapping interference ranges (e.g., a low interference level having a lowest interference range, a medium interference level having an interference range greater than the lowest interference range, and a high interference level having an interference range greater than the lowest interference range and the medium interference range). In some aspects, the possible interference levels may be divided into a greater quantity of non-overlapping interference ranges.

The UE may identify an interference level for an interference measurement by determining which interference range the interference measurement falls within. For example, the UE may identify a low interference level for an interference measurement that falls within the interference range associated with the low interference level. As another example, the UE may identify a medium interference level for an interference measurement that falls within the interference range associated with the medium interference level. As another example, the UE may identify a high interference level for an interference measurement that falls within the interference range associated with the high interference level.

As shown in FIG. 3B, and by reference number 306, the UE may transmit SRSs that indicate the interference levels in each of the plurality of subbands. For example, the UE may transmit, in subband 1, one or more SRSs that indicate the one or more interference levels in subband 1, may transmit, in subband 2, one or more SRSs that indicate the one or more interference levels in subband 2, and so on. In some aspects, the UE may transmit an SRS for each beam on which a measurement resource was measured in each subband.

In some aspects, the SRS sequence used for a particular SRS may indicate an interference level represented by the SRS. For example, a first SRS sequence may be associated with a low interference level, a second SRS sequence may be associated with a medium interference level, and a third SRS sequence may be associated with a high interference level. In some aspects, other SRS sequence and interference level schemes may be used. In some aspects, each SRS sequence that represents an interference level may be a cyclically shifted Zadoff-Chu sequence or another type of complex sequence.

In some aspects, the transmission of the SRSs to the BS may serve as an indication of a NACK for a PDSCH communication transmitted in an SPS occasion in a subband. For example, if the UE is unable to decode a PDSCH communication in an SPS occasion on subband 1, the UE may transmit the SRSs across the plurality of subbands to indicate a NACK for the PDSCH communication to the BS. Thus, if the UE is capable of decoding the PDSCH communication, the UE may refrain from transmitting the SRSs across the plurality of subbands, and the BS may interpret the absence of the SRSs as an acknowledgement (ACK). In this case, the BS may assume that the resource for SRS transmission is "reserved," because in this case the BS knows where to look for SRS and see if SRS has been transmitted or not.

As shown in FIG. 3C, and by reference number 308, the BS may receive the SRSs across the plurality of subbands and may identify the interference levels for each of the plurality of subbands based at least in part on the SRS sequences of the SRSs. For example, the BS may identify an interference level for subband 1 based at least in part on the SRS sequence of the SRS transmitted on the uplink in subband 1, may identify an interference level for subband 2 based at least in part on the SRS sequence of the SRS transmitted on the uplink in subband 2, and so on. In some aspects, if a plurality of beams are used in each subband, the BS may identify an interference level for each beam based at least in part on the SRS sequences of SRSs associated with each beam.

As indicated above, each SRS sequence may be associated with a particular interference level. Accordingly, the BS may identify the interference level of a subband by identifying the SRS sequence of the SRS transmitted in the subband, and by identifying the SRS sequence associated with the identified SRS sequence.

As further shown in FIG. 3C, and by reference number 310, the BS may schedule a retransmission occasion for a PDSCH communication. The BS may receive the SRSs from the UE on the plurality of subbands, and may determine that reception of the SRSs indicates a NACK for the PDSCH communication. The BS may schedule the retransmission occasion based at least in part on the interference levels in each of the plurality of subbands. For example, the BS may schedule the retransmission occasion to be in the subband with the lowest interference level, to be in a subband with an interference level that satisfies an interference level threshold (e.g., to be in a subband with a low interference level), and/or the like. In this way, if high interference caused (at least in part) the PDSCH communication to be undecodable at the UE, the BS may use the interference levels of the subbands to make an informed decision to schedule the retransmission occasion for retransmission of the PDSCH communication to be in a subband with a lower interference level, thereby increasing the likelihood that the retransmission of the PDSCH communication will be decodable at the UE.

In some aspects, the BS may schedule the retransmission occasion by transmitting a PDCCH communication to the UE in the subband in which the retransmission occasion is to occur. The PDCCH communication may include DCI that identifies the retransmission occasion. The BS may then retransmit the PDSCH communication in the retransmission occasion scheduled by the PDCCH communication.

As further shown in FIG. 3C, and by reference number 312, the BS may reconfigure one or more SPS occasions (e.g., SPS occasions that occur after reception of the SPSs transmitted from the UE) based at least in part on the interference levels on the plurality of subbands. For example, the BS may reconfigure the one or more SPS occasions to be in the subband with the lowest interference level, to be in a subband with an interference level that satisfies an interference level threshold (e.g., to be in a subband with a low interference level), and/or the like. In this way, the BS may use the interference levels of the subbands to make an informed decision to relocate subsequent SPS occasions to be in a subband with a lower interference level, thereby increasing the likelihood that the subsequent PDSCH communications will be decodable at the UE.

In some aspects, the BS may reconfigure the one or more SPS occasions by transmitting a physical downlink control channel (PDCCH) communication to the UE in the subband in which the one or more SPS occasions are to occur. The PDCCH communication may include an RRC communication, a MAC-CE communication, DCI, and/or the like.

In this way, the BS may receive the SRSs in each of the plurality of subbands, may identify the interference level in each of the plurality of subbands based at least in part on the SRS sequences of the SRSs, and may perform one or more actions based at least in part on the interference levels in each of the plurality of subbands, such as scheduling a retransmission of a PDSCH communication from a subband having a high interference level to another subband having a low interference level, reconfiguring one or more SPS occasions for PDSCH communication reception from a subband having a high interference level to another subband having a low interference level, and/or the like.

As indicated above, FIGS. 3A-3C are provided as one or more examples. Other examples may differ from what is described with respect to FIGS. 3A-3C.

FIGS. 4A-4E are diagrams illustrating one or more examples 400 of indicating a subband interference level using SRS, in accordance with various aspects of the present disclosure. As shown in FIGS. 4A-4E, example(s) 400 may include communication between a BS (e.g., BS 110) and a UE (e.g., UE 120). In some aspects, the BS and the UE may be included in a wireless network (e.g., wireless network 100) and may communicate via an access link that includes an uplink and a downlink. In some aspects, the BS and the UE may be included in an industrial IoT deployment and/or another type of deployment (e.g., a URLLC deployment, an eMBB deployment, and/or the like) in the wireless network.

Figure 4A:
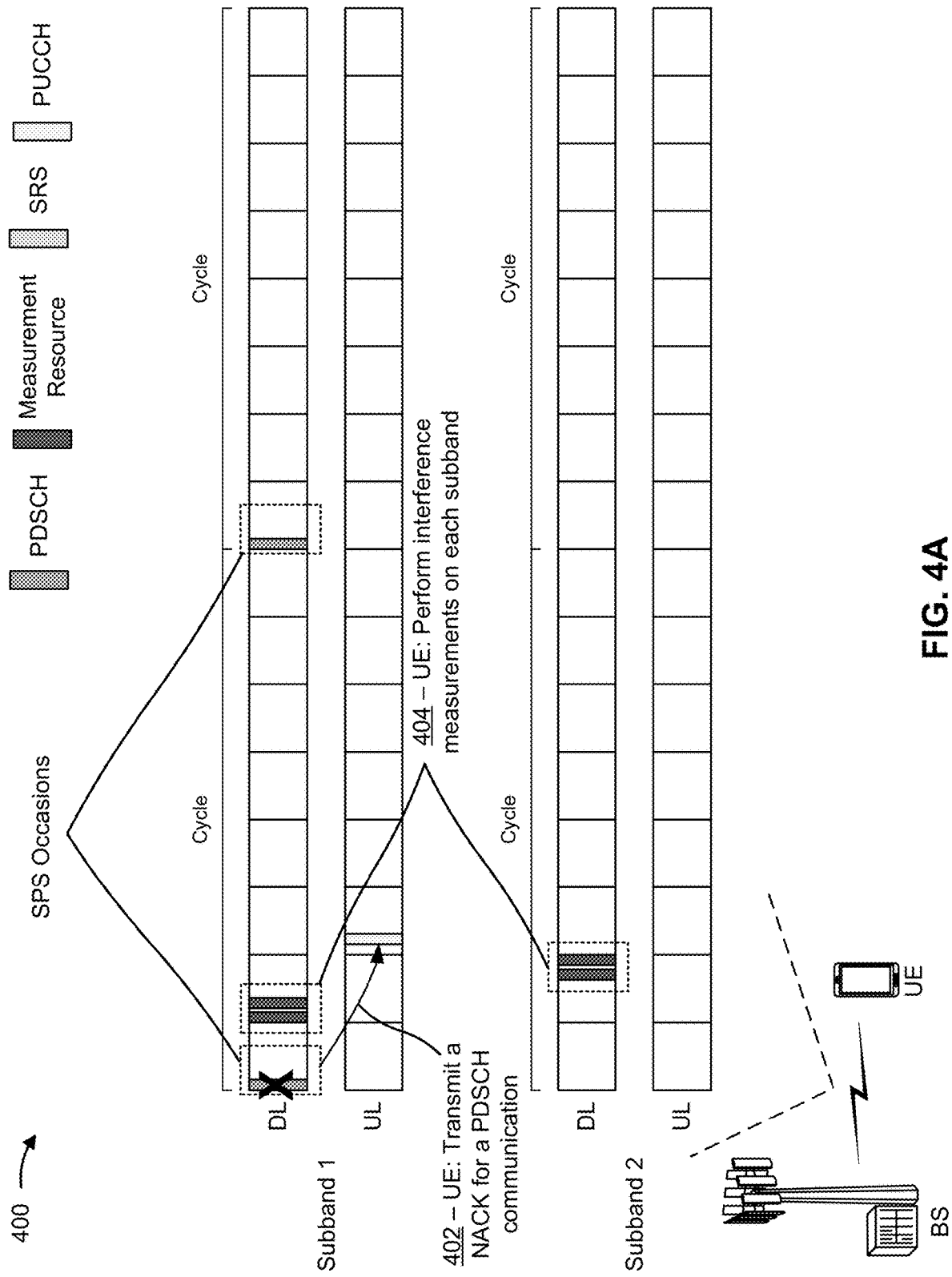

As shown in FIG. 4A, in some aspects, the bandwidth of the uplink (UL) and the downlink (DL) may each span across a plurality of subbands. In this case, a first portion of the bandwidth of the uplink and the downlink may be included in a first subband (e.g., subband 1), a second portion of the bandwidth of the uplink and the downlink may be included in a second subband (e.g., subband 2), and so on.

As further shown in FIG. 4A, the BS may schedule the transmission of PDSCH communications to the UE on the downlink via SPS scheduling. For example, the BS may transmit, to the UE, one or more RRC communications, one or more MAC-CE communications, and/or the like, which may configure periodic and/or aperiodic SPS occasions on the downlink. The SPS occasions may be time-frequency domain resources (e.g., symbols, slots, resource elements, resource blocks, subcarriers, and/or the like) scheduled on a particular subband. In the example illustrated in FIG. 4A, the SPS occasions configured for the UE are scheduled on subband 1.

In some aspects, the BS may be capable of reconfiguring SPS occasions configured for the UE and/or may be capable of scheduling retransmission occasions for retransmission of PDSCH communications to the UE. The BS may reconfigure SPS occasions and/or may schedule retransmission occasions based at least in part on interference on the plurality of subbands, among other factors and/or examples.

As further shown in FIG. 4A, and by reference number 402, the UE may transmit a NACK for a PDSCH communication transmitted by the BS in an SPS occasion in a subband (e.g., subband 1). For example, the UE may transmit a NACK for the PDSCH communication if the UE is unable to decode the PDSCH communication. In some aspects, the UE may transmit the NACK in a physical uplink control channel (PUCCH) communication (e.g., in uplink control information (UCI) in the PUCCH communication). The UE may transmit the PUCCH communication on the uplink in the subband in which the PDSCH communication was received (e.g., subband 1).

As further shown in FIG. 4A, and by reference number 404, the UE may perform interference measurements on each subband to support the BS in reconfiguring SPS occasions and/or scheduling retransmission occasions. For example, the UE may perform one or more interference measurements in subband 1, one or more interference measurements in subband 2, and so on. In some aspects, the UE may perform the interference measurements based at least in part on transmitting the NACK for the PDSCH communication. In some aspects, the UE may perform the interference measurements regardless of whether the UE transmits a NACK or an ACK for the PDSCH communication.

The UE may measure one or more measurement resources in each of the plurality of subbands to determine one or more interference measurements for each of the plurality of subbands. In some aspects, the BS may transmit a measurement resource in each of the plurality of subbands. In some aspects, the BS may transmit a plurality of measurement resources in each of the plurality of subbands, where each measurement resource in a particular subband is transmitted on a different beam in the subband. A measurement resource may include a CSI-RS, a DMRS, another type of reference signal, an IMR that occurs at a particular time-frequency resource, and/or the like. An interference measurement may include an RSRP measurement, an RSSI measurement, an RSRQ measurement, a CQI measurement, an SNR measurement, an SINR measurement, an LLR value, and/or the like.

Figure 4B:
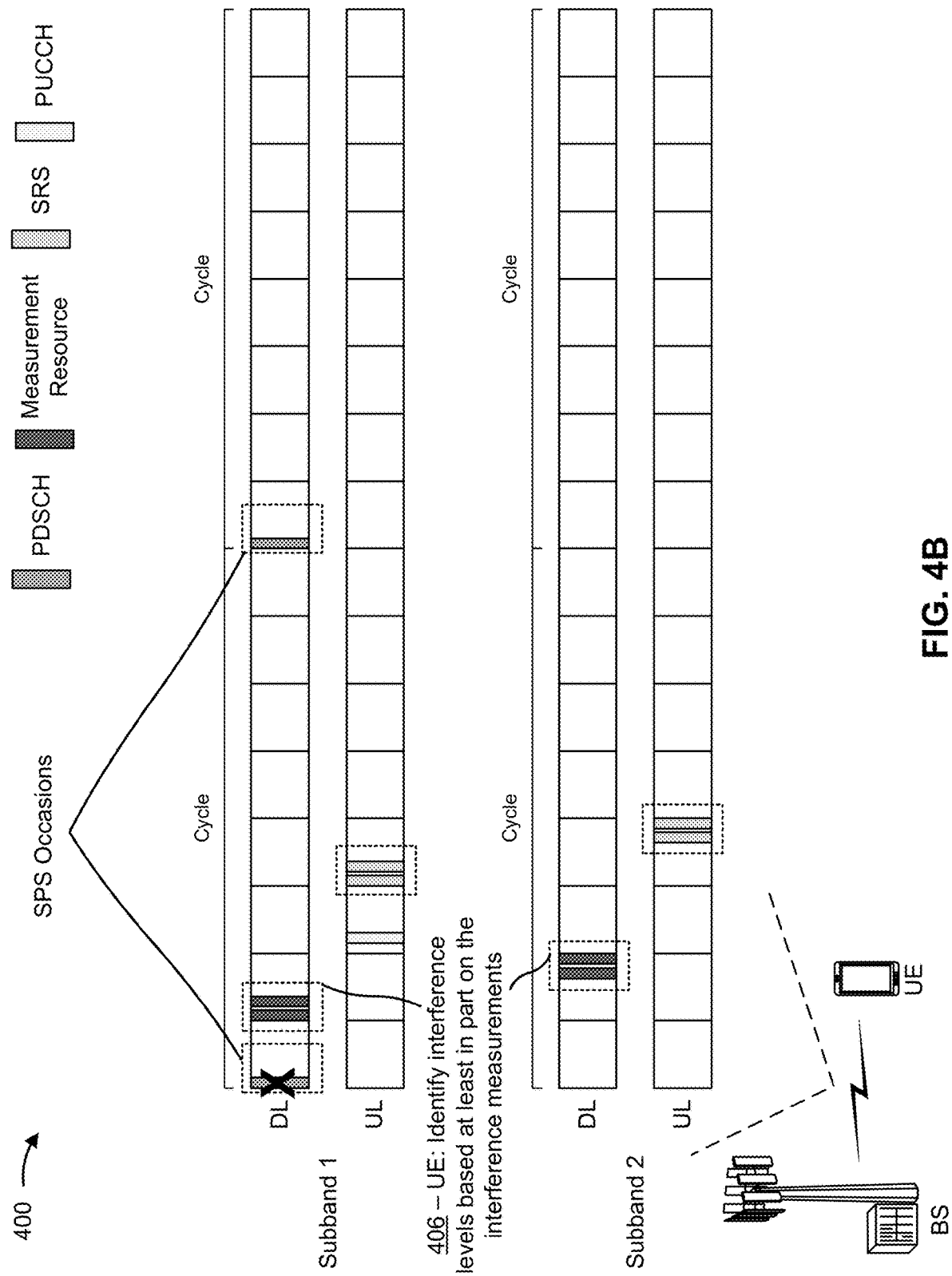

As shown in FIG. 4B, and by reference number 406, the UE may identify interference levels based at least in part on the interference measurements for each of the plurality of subbands. For example, the UE may identify one or more interference levels for subband 1 based at least in part on the one or more interference measurements in subband 1, may identify one or more interference levels for subband 2 based at least in part on the one or more interference measurements in subband 2, and so on.

In this case, the UE may quantize each of the interference measurements to a corresponding quantized interference level. As an example, the possible interference levels may be divided into three or more non-overlapping interference ranges (e.g., a low interference level having a lowest interference range, a medium interference level having an interference range greater than the lowest interference range, and a high interference level having an interference range greater than the lowest interference range and the medium interference range). In some aspects, the possible interference levels may be divided into a greater quantity of non-overlapping interference ranges.

The UE may identify an interference level for an interference measurement by determining which interference range the interference measurement falls within. For example, the UE may identify a low interference level for an interference measurement that falls within the interference range associated with the low interference level. As another example, the UE may identify a medium interference level for an interference measurement that falls within the interference range associated with the medium interference level. As another example, the UE may identify a high interference level for an interference measurement that falls within the interference range associated with the high interference level.

Figure 4C:
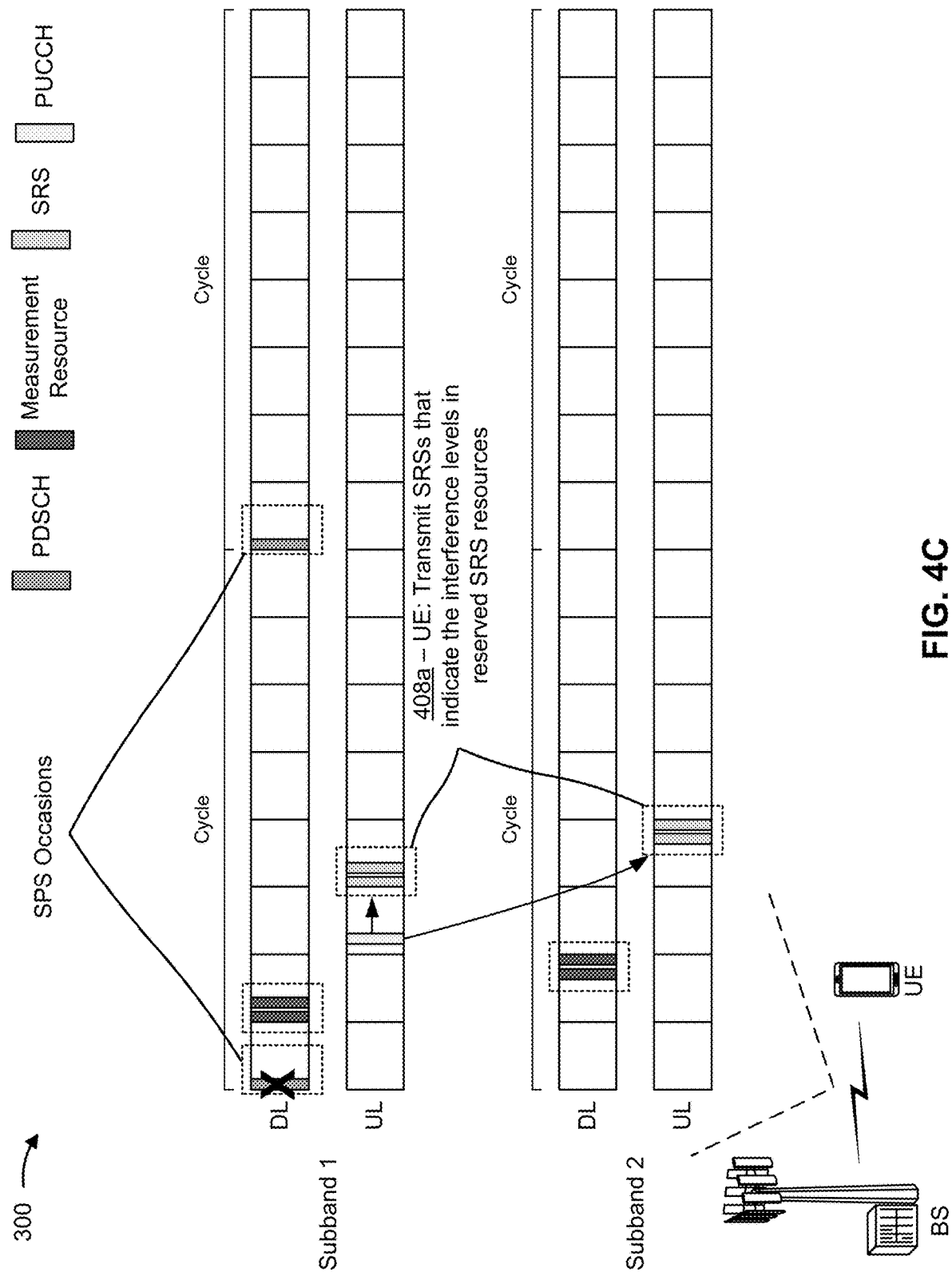

As shown in FIG. 4C, and by reference number 408 (e.g., reference number 408a and/or 408b), the UE may transmit SRSs that indicate the interference levels in each of the plurality of subbands. For example, the UE may transmit, in subband 1, one or more SRSs that indicate the one or more interference levels in subband 1, may transmit, in subband 2, one or more SRSs that indicate the one or more interference levels in subband 2, and so on. In some aspects, the UE may transmit an SRS for each beam on which a measurement resource was measured in each subband. In some aspects, the UE may transmit the SRSs based at least in part on transmitting the NACK for the PDSCH communication. In some aspects, the UE may transmit the SRSs based at least in part on transmitting an ACK for the PDSCH communication and determining that the interference measurement(s) for the subband in which the PDSCH communication was received does not satisfy an interference threshold.

In some aspects, the SRS sequence used for a particular SRS may indicate an interference level represented by the SRS. For example, a first SRS sequence may be associated with a low interference level, a second SRS sequence may be associated with a medium interference level, and a third SRS sequence may be associated with a high interference level. In some aspects, other SRS sequence and interference level schemes may be used. In some aspects, each SRS sequence that represents an interference level may be a cyclically shifted Zadoff-Chu sequence or another type of complex sequence.

As shown in FIG. 4C, and by reference number 408a, the UE may transmit the SRSs for each of the plurality of subbands in reserved SRS resources in each of the plurality of subbands. A reserved SRS resource may be a time-frequency resource that occurs at a particular timing offset (e.g., a particular quantity of symbols and/or slots) after transmission of the ACK or the NACK for the PDSCH communication. Moreover, a reserved SRS resource may be a time-frequency resource that is always reserved for the transmission of an SRS regardless of whether the UE will actually transmit an SRS in the time-frequency resource. In this case, if the UE does not use the reserved SRS resource to transmit an SRS, the reserved SRS resource is not repurposed for other uses. However, because a reserved SRS resource is always reserved for SRS transmissions, the timing offset between the transmission of the ACK or the NACK and the reserved SRS resource may be smaller relative to an SRS resource that needs to be activated prior to being used.

Figure 4D:
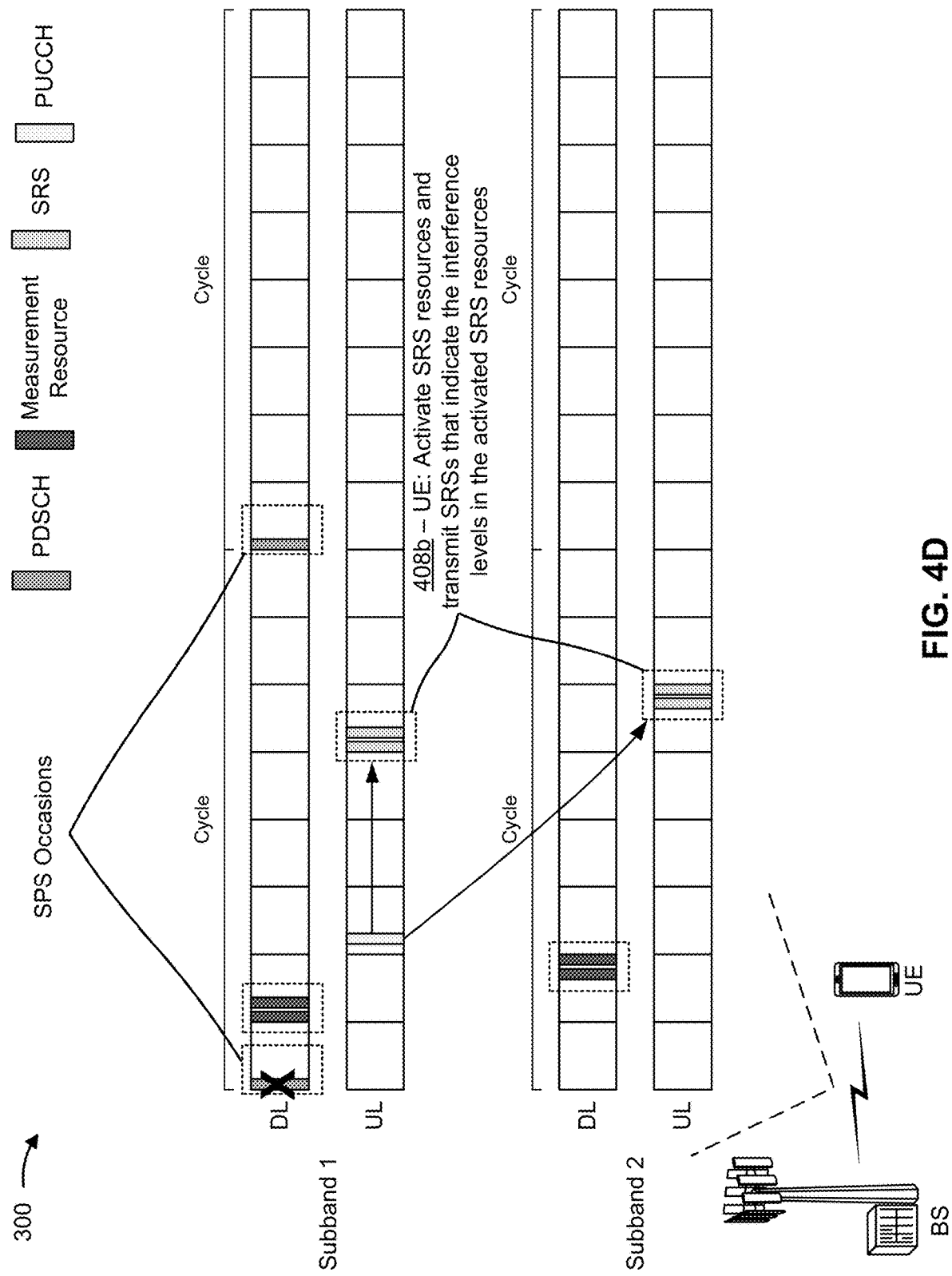

Additionally and/or alternatively, as shown in FIG. 4D, and by reference number 408b, the UE and/or the BS may activate SRS resources in which the UE is to transmit the SRSs for each of the plurality of subbands, and may transmit the SRSs in the activated SRS resources. In some aspects, the UE and/or the BS may activate the SRS resources based at least in part on transmitting the NACK for the PDSCH communication, based at least in part on transmitting an ACK for the PDSCH communication and determining that the interference measurement(s) for the subband in which the PDSCH communication was received does not satisfy an interference threshold, and/or the like. In this case, if the UE and/or the BS does not activate the SRS resources, the SRS resources may be repurposed by the UE and/or other UEs for other uses. However, the timing offset between the transmission of the ACK or the NACK and the SRS resources may be greater relative to reserved SRS resources to account for the timing needed to activate the SRS resources.

Figure 4E:
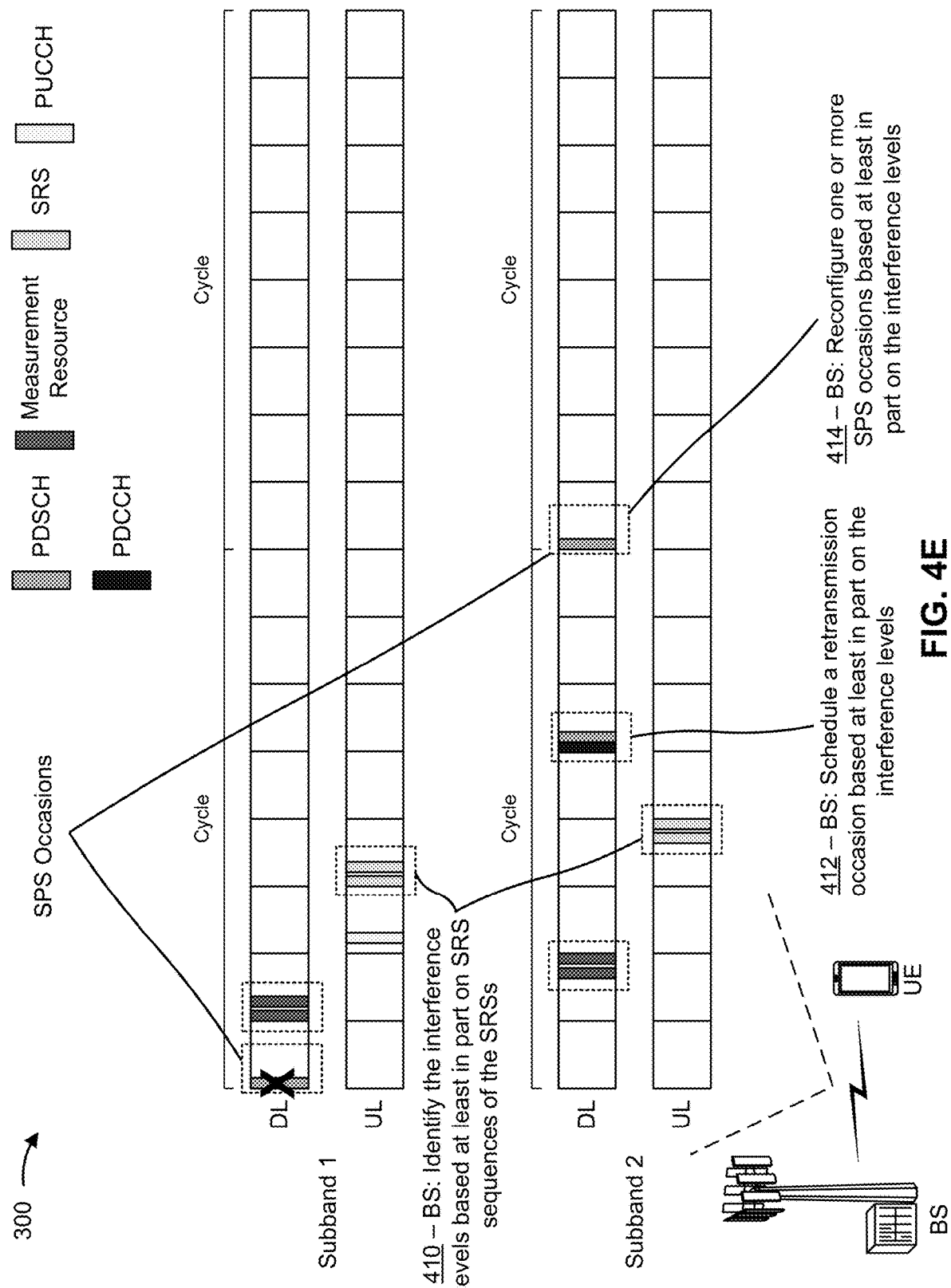

As shown in FIG. 4E, and by reference number 410, the BS may receive the SRSs across the plurality of subbands and may identify the interference levels for each of the plurality of subbands based at least in part on the SRS sequences of the SRSs. For example, the BS may identify an interference level for subband 1 based at least in part on the SRS sequence of the SRS transmitted on the uplink in subband 1, may identify an interference level for subband 2 based at least in part on the SRS sequence of the SRS transmitted on the uplink in subband 2, and so on. In some aspects, if a plurality of beams are used in each subband, the BS may identify an interference level for each beam based at least in part on the SRS sequences of SRSs associated with each beam.

As indicated above, each SRS sequence may be associated with a particular interference level. Accordingly, the BS may identify the interference level of a subband by identifying the SRS sequence of the SRS transmitted in the subband, and by identifying the SRS sequence associated with the identified SRS sequence.

As further shown in FIG. 4E, and by reference number 412, the BS may schedule a retransmission occasion for a PDSCH communication for which a NACK was received. The BS may schedule the retransmission occasion based at least in part on the interference levels in each of the plurality of subbands. For example, the BS may schedule the retransmission occasion to be in the subband with the lowest interference level, to be in a subband with an interference level that satisfies an interference level threshold (e.g., to be in a subband with a low interference level), and/or the like. In this way, if high interference caused (at least in part) the PDSCH communication to be undecodable at the UE, the BS may use the interference levels of the subbands to make an informed decision to schedule the retransmission occasion for retransmission of the PDSCH communication to be in a subband with a lower interference level, thereby increasing the likelihood that the retransmission of the PDSCH communication will be decodable at the UE.

In some aspects, the BS may schedule the retransmission occasion by transmitting a physical downlink control channel (PDCCH) communication to the UE in the subband in which the retransmission occasion is to occur. The PDCCH communication may include DCI that identifies the retransmission occasion. The BS may then retransmit the PDSCH communication in the retransmission occasion scheduled by the PDCCH communication.

As further shown in FIG. 4E, and by reference number 414, the BS may reconfigure one or more SPS occasions (e.g., SPS occasions that occur after reception of the SPSs transmitted from the UE) based at least in part on the interference levels on the plurality of subbands. For example, the BS may reconfigure the one or more SPS occasions to be in the subband with the lowest interference level, to be in a subband with an interference level that satisfies an interference level threshold (e.g., to be in a subband with a low interference level), and/or the like. In this way, the BS may use the interference levels of the subbands to make an informed decision to relocate subsequent SPS occasions to be in a subband with a lower interference level, thereby increasing the likelihood that the subsequent PDSCH communications will be decodable at the UE.

In some aspects, the BS may reconfigure the one or more SPS occasions by transmitting a physical downlink control channel (PDCCH) communication to the UE in the subband in which the one or more SPS occasions are to occur. The PDCCH communication may include an RRC communication, a MAC-CE communication, may include DCI, and/or the like.

In this way, the BS may receive the SRSs in each of the plurality of subbands, may identify the interference level in each of the plurality of subbands based at least in part on the SRS sequences of the SRSs, and may perform one or more actions based at least in part on the interference levels in each of the plurality of subbands, such as scheduling a retransmission of a PDSCH communication from a subband having a high interference level to another subband having a low interference level, reconfiguring one or more SPS occasions for PDSCH communication reception from a subband having a high interference level to another subband having a low interference level, and/or the like.

As indicated above, FIGS. 4A-4E are provided as one or more examples. Other examples may differ from what is described with respect to FIGS. 4A-4E.

FIG. 5 is a diagram illustrating an example process 500 performed, for example, by a UE, in accordance with various aspects of the present disclosure. Example process 500 is an example where the UE (e.g., UE 120) performs operations associated with indicating a subband interference level using SRS.

As shown in FIG. 5, in some aspects, process 500 may include performing a first interference measurement on a first subband of a plurality of subbands configured for the UE and a second interference measurement on a second subband of the plurality of subbands (block 510). For example, the UE (e.g., using receive processor 258, transmit processor 264, controller/processor 280, memory 282, and/or the like) may perform a first interference measurement on a first subband of a plurality of subbands configured for the UE and a second interference measurement on a second subband of the plurality of subbands, as described above.

As further shown in FIG. 5, in some aspects, process 500 may include identifying a first interference level based at least in part on the first interference measurement and a second interference level based at least in part on the second interference measurement (block 520). For example, the UE (e.g., using receive processor 258, transmit processor 264, controller/processor 280, memory 282, and/or the like) may identify a first interference level based at least in part on the first interference measurement and a second interference level based at least in part on the second interference measurement, as described above.

As further shown in FIG. 5, in some aspects, process 500 may include transmitting, to a BS, a first SRS on the first subband and a second SRS on the second subband, wherein an SRS sequence of the first SRS indicates the first interference level, and wherein an SRS sequence of the second SRS indicates the second interference level (block 530). For example, the UE (e.g., using receive processor 258, transmit processor 264, controller/processor 280, memory 282, and/or the like) may transmit, to a BS, a first SRS on the first subband and a second SRS on the second subband, as described above. In some aspects, an SRS sequence of the first SRS indicates the first interference level. In some aspects, an SRS sequence of the second SRS indicates the second interference level.

Process 500 may include additional aspects, such as any single aspect or any combination of aspects described below and/or in connection with one or more other processes described elsewhere herein.

In a first aspect, the first interference measurement is based at least in part on a first CSI-RS transmitted from the BS in the first subband or a first IMR in the first subband, and the second interference measurement is based at least in part on a second CSI-RS transmitted from the BS in the second subband or a second IMR in the second subband. In a second aspect, alone or in combination with the first aspect, transmission of the first SRS on the first subband indicates a negative acknowledgement for a physical downlink shared channel communication, transmitted from the BS, in a semi-persistent scheduling occasion on the first subband.

In a third aspect, alone or in combination with one or more of the first and second aspects, process 500 further comprises transmitting, on the first subband, a NACK for a physical downlink shared channel communication, transmitted from the BS, in an SPS occasion on the first subband, and transmitting the first SRS on the first subband and the second SRS on the second subband comprises transmitting, based at least in part on transmitting the NACK, the first SRS on the first subband and the second SRS on the second subband. In a fourth aspect, alone or in combination with one or more of the first through third aspects, transmitting the first SRS on the first subband and the second SRS on the second subband comprises transmitting the first SRS on the first subband in a first reserved SRS resource that occurs at a first timing offset from a time at which the NACK was transmitted, and transmitting the second SRS on the second subband in a second reserved SRS resource that occurs at a second timing offset from the time at which the NACK was transmitted.

In a fifth aspect, alone or in combination with one or more of the first through fourth aspects, transmitting the first SRS on the first subband and the second SRS on the second subband comprises activating, based at least in part on transmitting the NACK a first SRS resource, on the first subband, that occurs at a first timing offset from a time at which the NACK was transmitted, and a second SRS resource, on the second subband, that occurs at a second timing offset from the time at which the NACK was transmitted, transmitting the first SRS on the first subband in the first SRS resource, and transmitting the second SRS on the second subband in the second SRS resource. In a sixth aspect, alone or in combination with one or more of the first through fifth aspects, process 500 further comprises determining that the first interference measurement satisfies an interference threshold, and transmitting the first SRS on the first subband and the second SRS on the second subband comprises transmitting, based at least in part on determining that the first interference measurement satisfies the interference threshold, the first SRS on the first subband and the second SRS on the second subband.

In a seventh aspect, alone or in combination with one or more of the first through sixth aspects, process 500 includes receiving, from the BS and based at least in part on the first interference level and the second interference level, a PDCCH communication that schedules a retransmission occasion for retransmission of a PDSCH communication transmitted on the first subband, wherein the PDCCH communication is scheduling the retransmission of the PDSCH communication on the second subband. In an eighth aspect, alone or in combination with one or more of the first through seventh aspects, process 500 includes receiving, from the BS and based at least in part on the first interference level and the second interference level, a physical downlink control channel communication that reconfigures one or more semi-persistent scheduling occasions for PDSCH communication reception from the first subband to the second subband.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
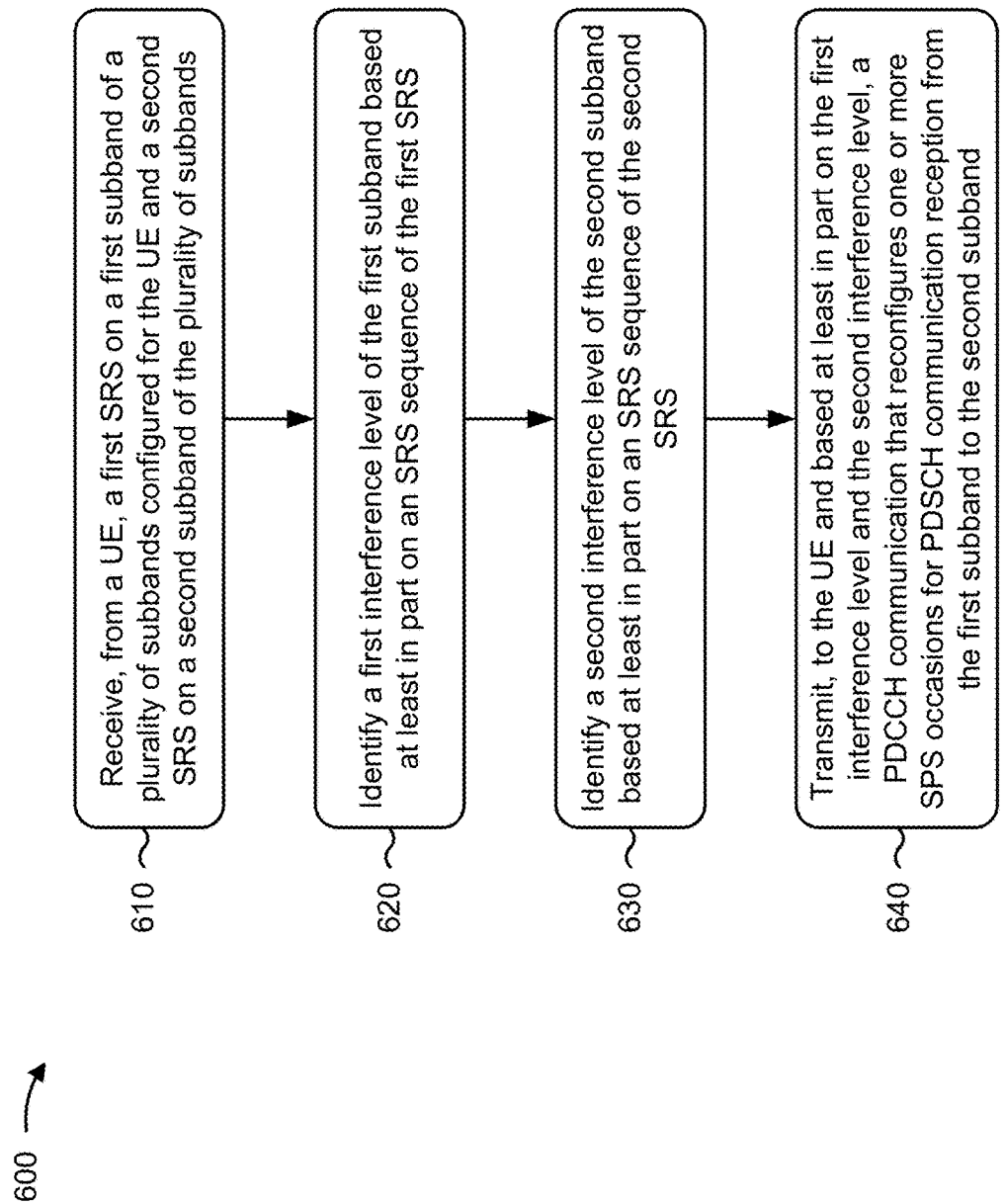
FIG. 6 is a diagram illustrating an example process performed, for example, by a UE, in accordance with various aspects of the present disclosure.

FIG. 6 is a diagram illustrating an example process 600 performed, for example, by a BS, in accordance with various aspects of the present disclosure. Example process 600 is an example where the BS (e.g., BS 110) performs operations associated with indicating a subband interference level using SRS.

As shown in FIG. 6, in some aspects, process 600 may include receiving, from a UE, a first SRS on a first subband of a plurality of subbands configured for the UE and a second SRS on a second subband of the plurality of subbands (block 610). For example, the BS (e.g., using transmit processor 220, receive processor 238, controller/processor 240, memory 242, and/or the like) may receive, from a UE, a first SRS on a first subband of a plurality of subbands configured for the UE and a second SRS on a second subband of the plurality of subbands, as described above.

As further shown in FIG. 6, in some aspects, process 600 may include identifying a first interference level of the first subband based at least in part on an SRS sequence of the first SRS (block 620). For example, the BS (e.g., using transmit processor 220, receive processor 238, controller/processor 240, memory 242, and/or the like) may identify a first interference level of the first subband based at least in part on an SRS sequence of the first SRS, as described above.

As further shown in FIG. 6, in some aspects, process 600 may include identifying a second interference level of the second subband based at least in part on an SRS sequence of the second SRS (block 630). For example, the BS (e.g., using transmit processor 220, receive processor 238, controller/processor 240, memory 242, and/or the like) may identify a second interference level of the second subband based at least in part on an SRS sequence of the second SRS, as described above.

As further shown in FIG. 6, in some aspects, process 600 may include transmitting, to the UE and based at least in part on the first interference level and the second interference level, a PDCCH communication that reconfigures one or more SPS occasions for PDSCH communication reception from the first subband to the second subband (block 640). For example, the BS (e.g., using transmit processor 220, receive processor 238, controller/processor 240, memory 242, and/or the like) may transmit, to the UE and based at least in part on the first interference level and the second interference level, a PDCCH communication that reconfigures one or more SPS occasions for PDSCH communication reception from the first subband to the second subband, as described above.

Process 600 may include additional aspects, such as any single aspect or any combination of aspects described below and/or in connection with one or more other processes described elsewhere herein.

In a first aspect, the first interference level is based at least in part on a first CSI-RS transmitted by the BS in the first subband or a first IMR in the first subband, and the second interference level is based at least in part on a second CSI-RS transmitted by the BS in the second subband or a second IMR in the second subband. In a second aspect, alone or in combination with the first aspect, process 600 further comprises transmitting, to the UE, a PDSCH communication on the first subband; and determining that reception of the first SRS on the first subband indicates a negative acknowledgement for the PDSCH communication. In a third aspect, alone or in combination with one or more of the first and second aspects, process 600 further comprises transmitting, to the UE and based at least in part on the first interference level and the second interference level, another PDCCH communication that schedules a retransmission occasion for retransmission of a PDSCH communication transmitted on the first subband.

In a fourth aspect, alone or in combination with one or more of the first through third aspects, process 600 further comprises receiving, on the first subband, a NACK for a PDSCH communication transmitted from the BS on the first subband, and receiving the first SRS on the first subband and the second SRS on the second subband comprises receiving, based at least in part on receiving the NACK the first SRS in a first reserved SRS resource that occurs at a first timing offset from a time at which the NACK was transmitted and the second SRS on the second subband in a second reserved SRS resource that occurs at a second timing offset from the time at which the NACK was transmitted.

In a fifth aspect, alone or in combination with one or more of the first through fourth aspects, process 600 further comprises receiving, on the first subband, a NACK for a PDSCH communication transmitted from the BS on the first subband, and receiving the first SRS on the first subband and the second SRS on the second subband comprises activating, based at least in part on receiving the NACK a first SRS resource, on the first subband, that occurs at a first timing offset from a time at which the NACK was transmitted and a second SRS resource, on the second subband, that occurs at a second timing offset from the time at which the NACK was transmitted, receiving the first SRS on the first subband in the first SRS resource, and receiving the second SRS on the second subband in the second SRS resource.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   performing a first interference measurement on a first subband of a plurality of subbands configured for the UE and a second interference measurement on a second subband of the plurality of subbands;
   identifying a first interference level based at least in part on the first interference measurement and a second interference level based at least in part on the second interference measurement; and
   transmitting, to a base station (BS), a first sounding reference signal (SRS) on the first subband and a second SRS on the second subband,
      wherein an SRS sequence of the first SRS indicates the first interference level, and
      wherein an SRS sequence of the second SRS indicates the second interference level.

2. The method of claim 1, wherein the first interference measurement is based at least in part on:
   a first channel state information reference signal (CSI-RS) transmitted from the BS in the first subband, or
   a first interference measurement resource (IMR) in the first subband; and
   wherein the second interference measurement is based at least in part on:
      a second CSI-RS transmitted from the BS in the second subband, or
      a second IMR in the second subband.

3. The method of claim 1, wherein transmission of the first SRS on the first subband indicates a negative acknowledgement for a physical downlink shared channel communication, transmitted from the BS, in a semi-persistent scheduling occasion on the first subband.

4. The method of claim 1, further comprising:
   transmitting, on the first subband, a negative acknowledgement (NACK) for a physical downlink shared channel communication, transmitted from the BS, in a semi-persistent scheduling occasion on the first subband; and
   wherein transmitting the first SRS on the first subband and the second SRS on the second subband comprises:
      transmitting, based at least in part on transmitting the NACK, the first SRS on the first subband and the second SRS on the second subband.

5. The method of claim 4, wherein transmitting the first SRS on the first subband and the second SRS on the second subband comprises:
   transmitting the first SRS on the first subband in a first reserved SRS resource that occurs at a first timing offset from a time at which the NACK was transmitted; and
   transmitting the second SRS on the second subband in a second reserved SRS resource that occurs at a second timing offset from the time at which the NACK was transmitted.

6. The method of claim 4, wherein transmitting the first SRS on the first subband and the second SRS on the second subband comprises:
   activating, based at least in part on transmitting the NACK:
      a first SRS resource, on the first subband, that occurs at a first timing offset from a time at which the NACK was transmitted, and a second SRS resource, on the second subband, that occurs at a second timing offset from the time at which the NACK was transmitted;
transmitting the first SRS on the first subband in the first SRS resource; and
transmitting the second SRS on the second subband in the second SRS resource.

7. The method of claim 1, further comprising:
determining that the first interference measurement satisfies an interference threshold; and
wherein transmitting the first SRS on the first subband and the second SRS on the second subband comprises:
transmitting, based at least in part on determining that the first interference measurement satisfies the interference threshold, the first SRS on the first subband and the second SRS on the second subband.

8. The method of claim 1, further comprising:
receiving, from the BS and based at least in part on the first interference level and the second interference level, a physical downlink control channel (PDCCH) communication that schedules a retransmission occasion for retransmission of a physical downlink shared channel (PDSCH) communication transmitted on the first subband,
wherein the PDCCH communication schedules the retransmission of the PDSCH communication on the second subband.

9. The method of claim 1, further comprising:
receiving, from the BS and based at least in part on the first interference level and the second interference level, a physical downlink control channel communication that reconfigures one or more semi-persistent scheduling occasions for physical downlink shared channel communication reception from the first subband to the second subband.

10. A method of wireless communication performed by a base station (BS), comprising:
receiving, from a user equipment (UE), a first sounding reference signal (SRS) on a first subband of a plurality of subbands configured for the UE and a second SRS on a second subband of the plurality of subbands;
identifying a first interference level of the first subband based at least in part on an SRS sequence of the first SRS;
identifying a second interference level of the second subband based at least in part on an SRS sequence of the second SRS; and
transmitting, to the UE and based at least in part on the first interference level and the second interference level, a physical downlink control channel (PDCCH) communication that reconfigures one or more semi-persistent scheduling (SPS) occasions for physical downlink shared channel (PDSCH) communication reception from the first subband to the second subband.

11. The method of claim 10, wherein the first interference level is based at least in part on:
a first channel state information reference signal (CSI-RS) transmitted by the BS in the first subband, or
a first interference measurement resource (IMR) in the first subband; and
wherein the second interference level is based at least in part on:
a second CSI-RS transmitted by the BS in the second subband, or
a second IMR in the second subband.

12. The method of claim 10, further comprising:
transmitting, to the UE, a PDSCH communication on the first subband; and
determining that reception of the first SRS on the first subband indicates a negative acknowledgement for the PDSCH communication.

13. The method of claim 10, further comprising:
transmitting, to the UE and based at least in part on the first interference level and the second interference level, another PDCCH communication that schedules a retransmission occasion for retransmission of a PDSCH communication transmitted on the first subband.

14. The method of claim 10, further comprising:
receiving, on the first subband, a negative acknowledgement (NACK) for a PDSCH communication transmitted from the BS on the first subband; and
wherein receiving the first SRS on the first subband and the second SRS on the second subband comprises:
receiving, based at least in part on receiving the NACK:
the first SRS in a first reserved SRS resource that occurs at a first timing offset from a time at which the NACK was transmitted, and
the second SRS on the second subband in a second reserved SRS resource that occurs at a second timing offset from the time at which the NACK was transmitted.

15. The method of claim 10, further comprising:
receiving, on the first subband, a negative acknowledgement (NACK) for a PDSCH communication transmitted from the BS on the first subband; and
wherein receiving the first SRS on the first subband and the second SRS on the second subband comprises:
activating, based at least in part on receiving the NACK:
a first SRS resource, on the first subband, that occurs at a first timing offset from a time at which the NACK was transmitted, and
a second SRS resource, on the second subband, that occurs at a second timing offset from the time at which the NACK was transmitted;
receiving the first SRS on the first subband in the first SRS resource; and
receiving the second SRS on the second subband in the second SRS resource.

16. A user equipment (UE) for wireless communication, comprising:
a memory; and
one or more processors operatively coupled to the memory, the memory and the one or more processors configured to:
perform a first interference measurement on a first subband of a plurality of subbands configured for the UE and a second interference measurement on a second subband of the plurality of subbands;
identify a first interference level based at least in part on the first interference measurement and a second interference level based at least in part on the second interference measurement; and
transmit, to a base station (BS), a first sounding reference signal (SRS) on the first subband and a second SRS on the second subband,
wherein an SRS sequence of the first SRS indicates the first interference level, and
wherein an SRS sequence of the second SRS indicates the second interference level.

17. The UE of claim 16, wherein the first interference measurement is based at least in part on:

a first channel state information reference signal (CSI-RS) transmitted from the BS in the first subband, or
a first interference measurement resource (IMR) in the first subband; and
wherein the second interference measurement is based at least in part on:
a second CSI-RS transmitted from the BS in the second subband, or
a second IMR in the second subband.

18. The UE of claim 16, wherein transmission of the first SRS on the first subband indicates a negative acknowledgement for a physical downlink shared channel communication, transmitted from the BS, in a semi-persistent scheduling occasion on the first subband.

19. The UE of claim 16, wherein the one or more processors are further configured to:
transmit, on the first subband, a negative acknowledgement (NACK) for a physical downlink shared channel communication, transmitted from the BS, in a semi-persistent scheduling occasion on the first subband; and
wherein the one or more processors, when transmitting the first SRS on the first subband and the second SRS on the second subband, are to:
transmit, based at least in part on transmitting the NACK, the first SRS on the first subband and the second SRS on the second subband.

20. The UE of claim 19, wherein the one or more processors, when transmitting the first SRS on the first subband and the second SRS on the second subband, are to:
transmit the first SRS on the first subband in a first reserved SRS resource that occurs at a first timing offset from a time at which the NACK was transmitted; and
transmit the second SRS on the second subband in a second reserved SRS resource that occurs at a second timing offset from the time at which the NACK was transmitted.

21. The UE of claim 19, wherein the one or more processors, when transmitting the first SRS on the first subband and the second SRS on the second subband, are to:
activate, based at least in part on transmitting the NACK:
a first SRS resource, on the first subband, that occurs at a first timing offset from a time at which the NACK was transmitted, and
a second SRS resource, on the second subband, that occurs at a second timing offset from the time at which the NACK was transmitted;
transmit the first SRS on the first subband in the first SRS resource; and
transmit the second SRS on the second subband in the second SRS resource.

22. The UE of claim 16, wherein the one or more processors are further configured to:
determine that the first interference measurement satisfies an interference threshold; and
wherein the one or more processors, when transmitting the first SRS on the first subband and the second SRS on the second subband, are to:
transmit, based at least in part on determining that the first interference measurement satisfies the interference threshold, the first SRS on the first subband and the second SRS on the second subband.

23. The UE of claim 16, wherein the one or more processors are further configured to:
receive, from the BS and based at least in part on the first interference level and the second interference level, a physical downlink control channel (PDCCH) communication that schedules a retransmission occasion for retransmission of a physical downlink shared channel (PDSCH) communication transmitted on the first subband,
wherein the PDCCH communication schedules the retransmission of the PDSCH communication on the second subband.

24. The UE of claim 16, wherein the one or more processors are further configured to:
receive, from the BS and based at least in part on the first interference level and the second interference level, a physical downlink control channel communication that reconfigures one or more semi-persistent scheduling occasions for physical downlink shared channel communication reception from the first subband to the second subband.

25. A base station (BS) for wireless communication, comprising:
a memory; and
one or more processors operatively coupled to the memory, the memory and the one or more processors configured to:
receive, from a user equipment (UE), a first sounding reference signal (SRS) on a first subband of a plurality of subbands configured for the UE and a second SRS on a second subband of the plurality of subbands;
identify a first interference level of the first subband based at least in part on an SRS sequence of the first SRS;
identify a second interference level of the second subband based at least in part on an SRS sequence of the second SRS; and
transmit, to the UE and based at least in part on the first interference level and the second interference level, a physical downlink control channel (PDCCH) communication that reconfigures one or more semi-persistent scheduling (SPS) occasions for physical downlink shared channel (PDSCH) communication reception from the first subband to the second subband.

26. The BS of claim 25, wherein the first interference level is based at least in part on:
a first channel state information reference signal (CSI-RS) transmitted by the BS in the first subband, or
a first interference measurement resource (IMR) in the first subband; and
wherein the second interference level is based at least in part on:
a second CSI-RS transmitted by the BS in the second subband, or
a second IMR in the second subband.

27. The BS of claim 25, wherein the one or more processors are further configured to:
transmit, to the UE, a PDSCH communication on the first subband; and
determine that reception of the first SRS on the first subband indicates a negative acknowledgement for the PDSCH communication.

28. The BS of claim 25, wherein the one or more processors are further configured to:
transmit, to the UE and based at least in part on the first interference level and the second interference level, another PDCCH communication that schedules a retransmission occasion for retransmission of a PDSCH communication transmitted on the first subband.

29. The BS of claim 25, wherein the one or more processors are further configured to:
  receive, on the first subband, a negative acknowledgement (NACK) for a PDSCH communication transmitted from the BS on the first subband; and
  wherein the one or more processors, when receiving the first SRS on the first subband and the second SRS on the second subband, are to:
    receive, based at least in part on receiving the NACK:
      the first SRS in a first reserved SRS resource that occurs at a first timing offset from a time at which the NACK was transmitted, and
      the second SRS on the second subband in a second reserved SRS resource that occurs at a second timing offset from the time at which the NACK was transmitted.

30. The BS of claim 25, wherein the one or more processors are further configured to:
  receive, on the first subband, a negative acknowledgement (NACK) for a PDSCH communication transmitted from the BS on the first subband; and
  wherein the one or more processors, when receiving the first SRS on the first subband and the second SRS on the second subband, are to:
    activate, based at least in part on receiving the NACK:
      a first SRS resource, on the first subband, that occurs at a first timing offset from a time at which the NACK was transmitted, and
      a second SRS resource, on the second subband, that occurs at a second timing offset from the time at which the NACK was transmitted;
    receive the first SRS on the first subband in the first SRS resource; and
    receive the second SRS on the second subband in the second SRS resource.

* * * * *